Feb. 19, 1963  D. L. GROVE ET AL  3,077,720
TREE FRUIT HARVESTER
Filed May 9, 1960  4 Sheets-Sheet 1
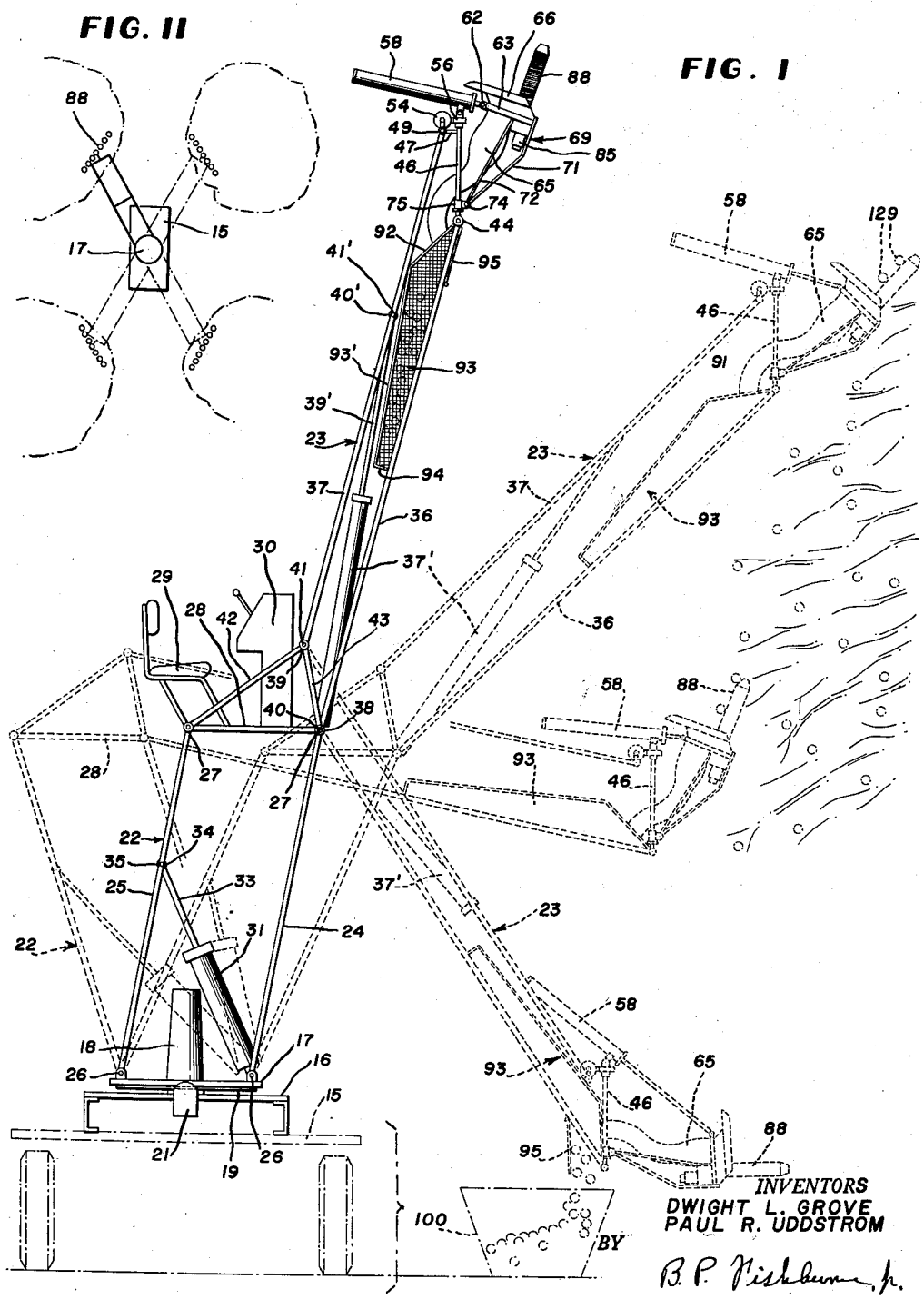
INVENTORS
DWIGHT L. GROVE
PAUL R. UDDSTROM
BY
ATTORNEY Feb. 19, 1963    D. L. GROVE ET AL    3,077,720
TREE FRUIT HARVESTER
Filed May 9, 1960    4 Sheets-Sheet 2
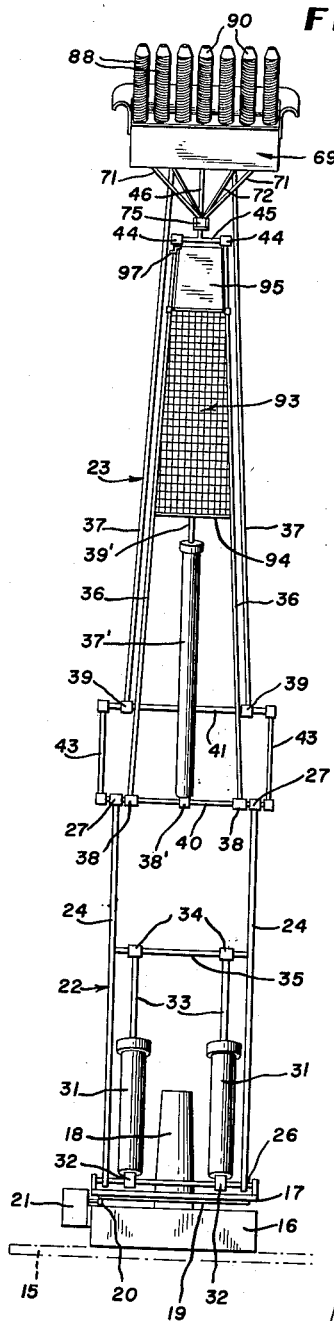
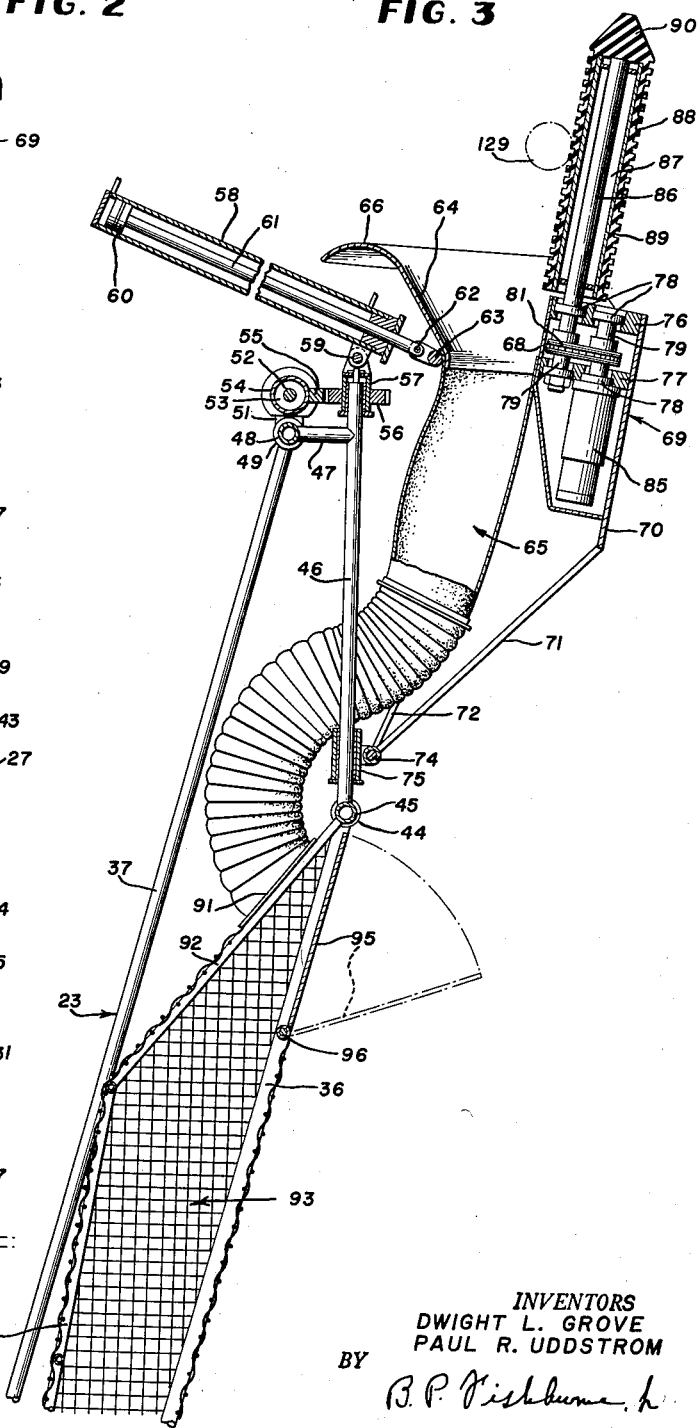
INVENTORS
DWIGHT L. GROVE
PAUL R. UDDSTROM
BY
ATTORNEY

INVENTORS
DWIGHT L. GROVE
PAUL R. UDDSTROM

ATTORNEY

Feb. 19, 1963

D. L. GROVE ET AL 3,077,720

TREE FRUIT HARVESTER

Filed May 9, 1960

INVENTORS
DWIGHT L. GROVE
PAUL R. UDDSTROM
BY
ATTORNEY

United States Patent Office 3,077,720
Patented Feb. 19, 1963

3,077,720
TREE FRUIT HARVESTER
Dwight L. Grove, Box 106, Shady Grove, Pa., and Paul R. Uddstrom, 302 S. Center St., Eustis, Fla.
Filed May 9, 1960, Ser. No. 27,816
13 Claims. (Cl. 56—328)

This invention relates to a tree fruit harvester.

A primary object of the invention is to provide a mechanized tree fruit harvester particularly well adapted for harvesting oranges, or the like, on the tree in a rapid or expeditious manner and without bruising or otherwise damaging the fruit.

Another object of the invention is to provide a mechanized tree fruit harvester which may be positioned in an orange grove near several trees, whereby the fruit growing on the several trees may be harvested to a great extent without moving or repositioning the vehicle which carries the harvesting mechanism.

A further and more specific object is to provide a harvester having means to engage the fruit and twist the fruit upon its stem for separating the fruit from the branch without bruising or damaging the fruit or the tree.

Another object is to provide means movable over the outer reaches of the tree branches with a combing action to thereby remove substantially all of the fruit from the tree with great facility.

Another object is to provide harvesting apparatus of the above mentioned character which is operable to remove the fruit from the tree substantially from the bottom to the top of the tree and around approximately one-half the circumference of the tree while the apparatus is in one fixed position with respect to the tree.

Still another object of the invention is to provide a harvester which may be operated and controlled substantially by one operator and which is hydraulically actuated throughout under the influence of a simplified control device readily accessible to the operator.

Another object is to provide novel and simplified means for conveying the unit from the point of picking or harvesting to a lowered position where the fruit is deposited in tote boxes or the like.

Other objects and advantages of the invention will be apparent during the course of the following description.

In the accompanying drawings forming part of this application and in which like numerals are employed to designate like parts throughout the same, FIG. 1 is a side elevation of a tree fruit harvester according to the invention, partly diagrammatic, and showing in broken lines various positions of the harvesting apparatus;

FIG. 2 is a front elevation at right angles to FIG. 1;

FIG. 3 is an enlarged fragmentary central vertical section through the upper portion of the harvester shown in FIG. 1;

FIG. 11 is a diagrammatic plan view on a reduced scale showing the harvester in position to harvest fruit from several adjacent trees without relocating the harvester.

Figure 4:
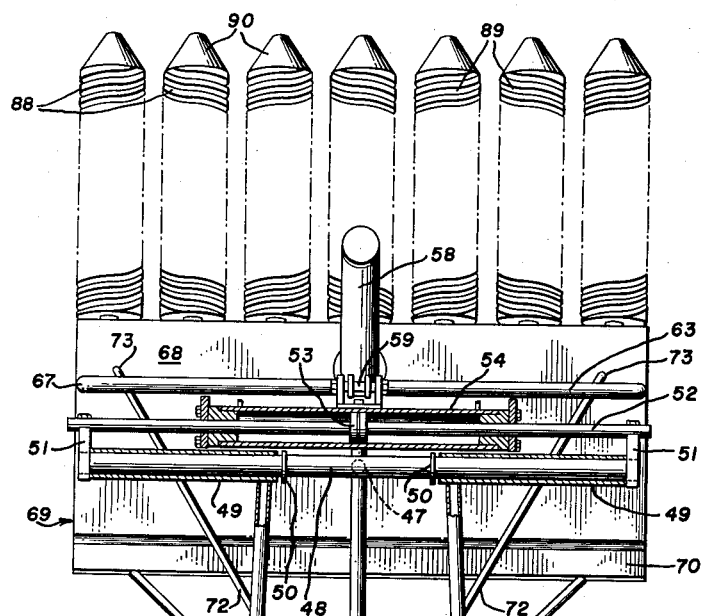
FIG. 4 is a fragmentary rear elevation of the elements shown in FIG. 3, partly in section.
Figure 6:
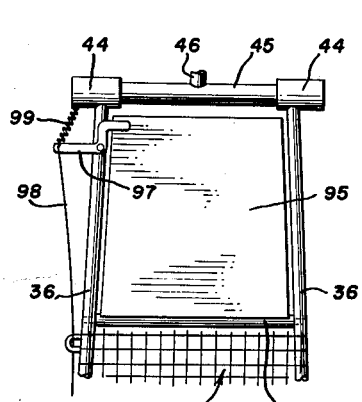
FIG. 6 is a fragmentary front elevation of a discharge gate and associated elements on the storage hopper carried by the boom.

In the drawings, wherein for the purpose of illustration is shown a preferred embodiment of the invention, the numeral 15 designates the bed of a wheeled support, such as a wagon or automotive truck. A horizontal supporting base 16 for the harvester is suitably rigidly mounted upon the truck bed 15 as indicated in FIG. 1. The harvester embodies an adjustable boom structure shown in its entirety in FIG. 1 and secured to a horizontal turntable 17 journaled for rotation upon the base 16 by a suitable frictionless bearing structure 18, rigidly secured to the base 16. The turntable 17 is provided upon its lower side in conventional manner with a circular bull-gear 19 adjacent its periphery driven by a pinion 20, in turn operated by a suitable hydraulic motor 21 fixedly secured to the base 16.

The harvester boom, shown particularly in FIGS. 1 and 2, comprises lower and upper articulated sections 22 and 23 which are independently adjustable by means to be described. The lower boom section 22 is in the nature of a double-parallelogram linkage including forward and rearward laterally spaced pairs of bars 24 and 25 having their lower ends pivotally secured to the turntable 19 as at 26. The tops of the bars 24 and 25 are pivotally interconnected at 27 with a horizontal platform member 28 adapted to support the operator, suitable chair means 29 for the operator, and a suitable control box 30.

A pair of actuating cylinders 31 for the lower boom section 22 are provided and these cylinders have their lower ends pivotally connected at 32 with the horizontal pivot element 26 carrying the lower ends of the bars 24. The cylinders 31 contain pistons having piston rods 33 which project above the cylinders and have their ends pivoted at 34 to a cross bar 35 having its ends suitably secured between the rear bars 25 of the lower boom section. The cylinders 31 are arranged inwardly of, or between, the bars 24 and 25 and the cylinders extend diagonally of the bars as indicated in FIG. 1.

The upper boom section 23 likewise embodies forward and rearward spaced pairs of bars 36 and 37, having their lower ends pivoted at 38 and 39, respectively, to horizontal members 40 and 41, which form part of the platform structure 28. As shown in FIG. 2, the horizontal member 40 also receives the pivots 27 of the forward bars 24. The platform 28 has frame sides comprising links or bars 42 and 43, having their ends secured to the cross members 40 and 41, as shown in FIG. 2. The bars 36 and 37 of the upper boom section 23 are adapted to swing vertically upon their pivots 38 and 39 in a manner to be described. An upstanding cylinder 37' is arranged between the pairs of bars 36 and 37 and has its lower end pivoted at 38' upon the horizontal cross bar 40. The cylinder 37' contains a piston and a piston rod 39', having its upper end pivoted at 40' to another horizontal cross bar 41' interconnecting the bars 37 a substantial distance below their upper ends, see FIG. 1. The platform member 28 remains horizontal in all adjusted positions of the boom, as will be apparent as the description proceeds.

The upper ends of the forward bars 36 carry horizontal sleeves 44, rigid therewith, FIG. 4, which sleeves pivotally receive a horizontal cross bar 45, having rigidly secured thereto at its transverse center a vertically extending bar 46, which remains vertically disposed in all adjusted positions of the boom. Near its upper end the vertical bar 46 carries a rearwardly projecting horizontal extension 47 rigid therewith and having its rear end rigidly secured by welding or the like to a transverse horizontal shaft 48 of considerable length, see FIG. 4.

Sleeves 49 are mounted rotatably upon the end portions of shaft 48, and the upper ends of the rear bars 37 are rigidly secured to the sleeves 49 near their inner ends, as shown in FIG. 4. The shaft 48 may have fixed stop collars 50 near and inwardly of the sleeves 49 to prevent endwise movement of the latter. The shaft 48 carries crossheads 51 at its ends, rigid therewith, and these crossheads project upwardly from the shaft 48 and are in turn rigidly secured to a transverse horizontally double-ended piston rod 52, carrying a centrally located piston 53, slidable within a horizontally shiftable hydraulic cylinder 54, carried bodily by the piston rod 52 and associated elements.

Upon its forward side, the cylinder 54 carries a rack bar 55 rigid therewith, and having meshed engagement with a pinion 56, rigid with a bearing sleeve 57, journaled for rotation upon the upper end of the vertical bar 46. The pinion 56 remains constantly meshed with the rack bar 55 at all times.

A harvester head actuating cylinder 58 has its forward end pivoted to the top of the rotatable bearing 57, as at 59, and this cylinder is vertically swingable upon its pivot 59 and is also rotatable with the bearing 57 about the vertical axis of the bar 46. The cylinder 58 contains a piston 60 having a piston rod 61 pivotally secured at 62 to a U-shaped frame or yoke 63, surrounding and rigidly secured to the inlet or mouth portion 64 of a flexible tubular conveyor chute 65. The upwardly opening mouth portion 64 of the chute 65 is preferably flared and rounded, as at 66, to provide a wide opening permitting ease of entry of the harvested fruit into the chute 65. The upper end of the chute 65 is securely attached to the rigid mouth portion 64 and yoke 63 in any preferred manner.

Forwardly extending arms 67 of the yoke 63 are rigidly connected to the back wall 68 of a box or housing 69 for the drive gearing of fruit harvesting spindles to be described. The lower front wall extension 70 of housing 69 is rigidly connected with diagonal braces 71, and similar diagonal braces 72 have their upper ends rigidly secured by welding or the like at 73 to the back wall 68 of housing 69. The braces 71 and 72 diverge downwardly and their lower ends are pivotally secured at 74 to a second rotatable sleeve bearing 75 journaled for rotation upon the vertical bar 46.

It may now be seen that the entire housing 69, the braces 71 and 72, yoke 63, cylinder 58 and associated elements are all adapted to turn horizontally, as a unit, with the bearings 57 and 75, upon the vertical axis of the bar 46, under influence of the pinion 56, driven by the reciprocatory rack bar 55 and cylinder 54. The double-ended piston rod 52 remains stationary and does not reciprocate relative to the upper boom section 23, including bars 37, FIG. 4.

With continued reference to the drawings, particularly FIGS. 3 and 7–9, the housing 69 contains support plate 76 and 77, having openings receiving ball bearings 78, or the like, within which are journaled for rotation a plurality of relatively short shafts 79 carrying sprocket wheels 80 rigid therewith and arranged between the plates 76 and 77. An endless sprocket chain 81 is trained over the sprocket wheels 80 in the zigzag manner, best shown in FIG. 9, and forward corner idler shafts 82, having sprocket wheels 83, are also journaled upon the plates 76 and 77 to receive the straight forward run 84 of the endless sprocket chain 81, FIG. 9. A suitable hydraulic drive motor 85 within the housing 69 and depending from the support plate 77 is operatively connected with one of the shafts 79, see FIGS. 3 and 7, to drive all of the rear shafts 79 and the shafts 82 in unison and in the same direction.

The rearmost row of shafts 79 have upstanding extensions 86, extending above the housing 69 for a considerable distance and carrying enlarged cylindrical rolls or tubes 87 adapted for rotation therewith.

Figure 7:
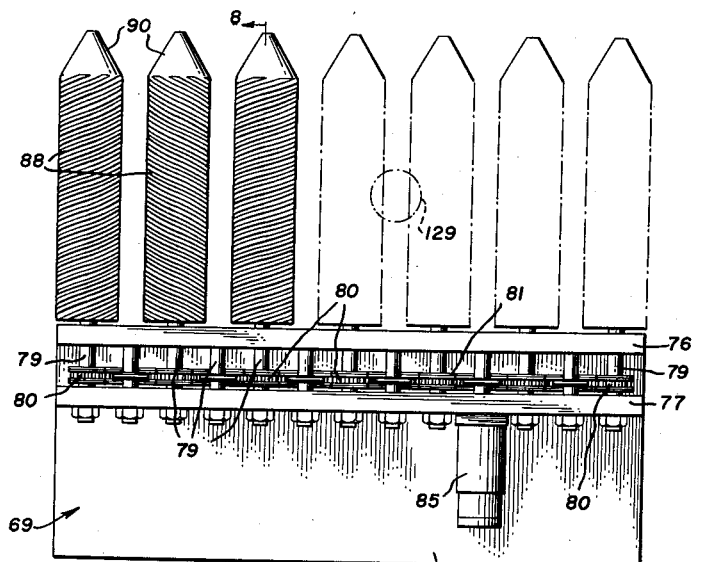
FIG. 7 is a fragmentary rear elevation of the harvesting head alone.
Figure 8:
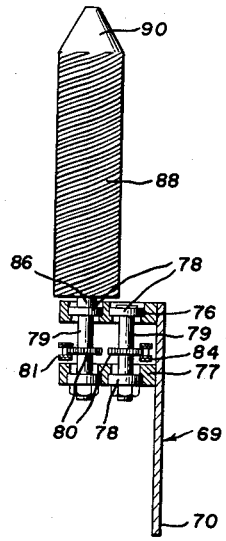
FIG. 8 is a vertical sectional view taken on line 8—8 of FIG. 7.

Each roll or tube 87 has a convering 88 of medium soft rubber, synthetic rubber, or the like, preferably spirally grooved in its periphery, as shown at 89. The upper end of each rubber-covered roll has a preferably conically tapered extremity 90 integral therewith, as plainly shown in FIG. 3. Each roll is cylindrical and elongated axially as shown in the drawings. Alternate rubber-covered rolls 87 are preferably spirally grooved, right hand and left hand, as indicated in FIGS. 4 and 7, for a purpose to be described. The rear sides of the row of rolls 87 are arranged adjacent the forward side of the chute 65, so that the fruit stripped from the tree by the revolving rolls will drop directly into the mouth of the chute. The revolving rolls are spaced apart equi-distantly in the row of rolls as indicated in the drawings.

The lower discharge end of the flexible chute 65 is suitably secured at 91 to the inclined top 92 of an elongated preferably wire mesh storage hopper 93, having a rigid box-like frame 93' secured only to the forward bars 36 of upper boom section 23. The lower end 94 of the storage hopper 93 terminates near the longitudinal center of the upper boom section 23. The top and sides and lower end of the storage hopper are closed and the chute 65 communicates directly with the top of the storage hopper to convey the harvested fruit thereto.

The storage hopper is provided at its upper end and forward side with a vertically swingable discharge door or gate 95, pivoted to the bars 36, as at 96. The gate 95 has a pivoted latch 97 operated by a flexible cord or cable 98, trained along the boom to a point adjacent the operator on the platform 28. A spring 99 maintains the latch 97 normally in the active or latching position relative to the gate 95. The gate may be closed manually by an operator on the ground or automatically, after opening the same, by suitable means, not shown.

*Operation*

The harvester is adapted to remove oranges or like tree fruit from the tree automatically and to convey the fruit to the storage hopper 93, and ultimately the fruit is discharged from the storage hopper into tote boxes 100 located on the ground near the trees.

Generally speaking, the harvesting rolls or spindles 87, operating in unison, function like a comb near the outer reaches of the tree branches where most of the fruit is located. Starting with the lowermost branches, FIG. 1, the harvesting head, comprising the rolls 87, is shifted upwardly to comb or strip the fruit from the tree along a path which may extend substantially to the top of the tree. The harvester may be adjusted as will be described so that fruit may be stripped or combed from substantially one-half of any tree without relocating the truck or carrier. In other words, the harvester is capable of stripping the fruit from the tree, bottom to top thereof, and around the tree circumferentially, for approximately 180° or slightly less. Likewise, as shown in diagrammatic FIG. 11, the harvester can strip the fruit from two, three, or four adjacent trees without changing its basic position in the orange grove, or the like. In addition to the mentioned combing action the spindles or rolls 87 twist the fruit upon its stem to effectively detach the fruit without crushing or bruising it and without damaging the small branches or twigs.

The harvester is capable of several main movements or adjustments during its operation. The hydraulic motor 21 may turn the entire boom structure and turntable 17 upon the vertical axis provided by the bearing structure 18, and this adjustment facilitates harvesting the fruit from approximately one-half the circumference of the tree, as explained.

The hydraulic cylinders 31 may be actuated to tilt or swing the lower boom section vertically upon its pivots 26 to shift the entire boom structure and the rolls 87 toward or from the tree.

The upper boom section 23 is independently swingable upon its pivots 38 and 39 through the operation of the cylinder 37' to raise and lower the upper boom section and associated elements, or to further adjust the rolls 87 toward or from the tree.

Through the medium of the cylinder 58, the harvesting head, comprising housing 69, rolls 87, chute 65 and associated elements, may be swung vertically upon the horizontal axis of the bar 45 which rotates in the sleeves 44 to adjust the rolls 87 from upstanding to inclined or more nearly horizontal positions, as when the fruit is being removed from the top of the tree. The connection of the piston rod 61 with the yoke 63 permits of this vertical swinging movement of the harvesting head upon the upper boom section 23.

Finally, the harvesting head, including the rolls 87, cylinder 58, housing 69 and associated elements, is swingable horizontally with the bearings 57 and 75 upon the vertical axis of the bar 46 under influence of the rack bar 55, and pinion 56. The harvesting head is swingable in this manner through relatively wide limits as determined by the length of the rack bar to facilitate reaching around the tree for harvesting the fruit from approximately one-half of the tree, as previously explained.

Figure 10:
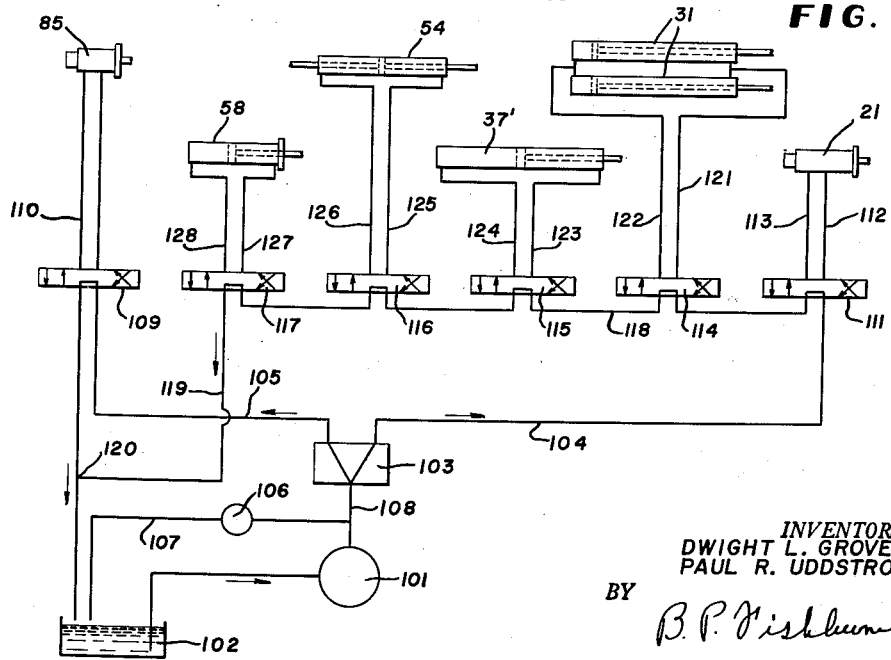
FIG. 10 is a hydraulic flow-diagram illustrating the control and operation of the hydraulic system which coordinates the movable elements of the harvester.

Reference may be had to diagrammatic FIG. 10 for an understanding of the control and coordination of the various movements above described.

A suitable pump 101 receives hydraulic fluid from a sump 102 and pumps the fluid through a flow-divider 103 having outlet lines 104 and 105. A bypass valve 106 is connected in a line 107 leading to the sump and to the line 108 between the pump and flow-divider for safety reasons.

The line 105 leads to a manual control valve 109 on the control panel 30 and from this valve to the hydraulic motor 85 which operates the spindles or rolls 87. A line 110 leads from the hydraulic motor 85 back to the sump, as shown. This arrangement provides a separate hydraulic circuit through the motor 85 so that the same will be delivered a constant volume of fluid, thus providing a constant speed of rotation for the rolls 87, which is desirable.

The line 104 from the flow-divider 103 leads to a manual valve 111 connected by lines 112 and 113 with the hydraulic motor 21 which operates the turntable 17. The manual valve 111 is connected in series with other manual valves 114, 115, 116, and 117 by a line 118, as shown. A line 119, connected with the line 118 and valve 117, leads back to the sump at 120. All of the valves mentioned are mounted upon the control box 30 at the reach of the operator.

Figure 5:
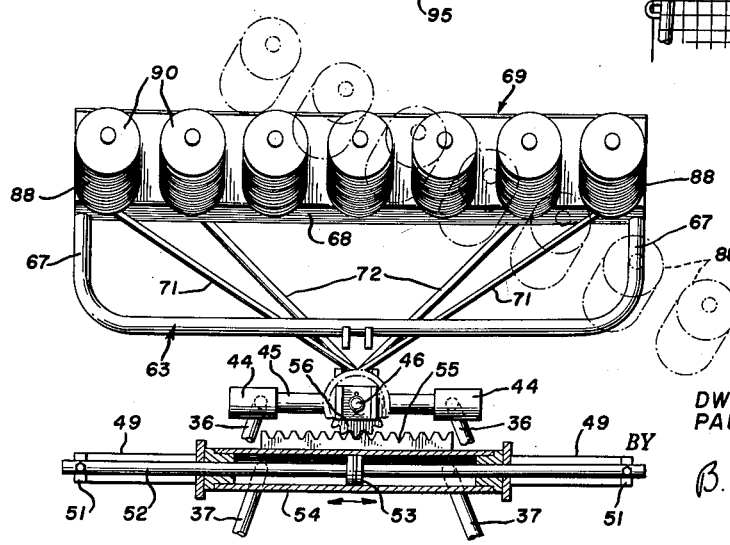
FIG. 5 is a fragmentary plan view of the elements shown in FIG. 4, partly in section and parts omitted.

With continued reference to FIG. 10, the cylinders 31 for the lower boom section 22 are connected with the valve 114 by lines 121 and 122. Similarly, the cylinder 37' is connected with the control valve 115 by lines 123 and 124. The cylinder 54, FIG. 5, is likewise connected with the valve 116 by lines 125 and 126, and the cylinder 58 is connected with the control valve 117 by lines 127 and 128.

It may thus be seen that all of the hydraulically operated instrumentalities of the harvester are selectively controllable by the operator on the platform 28 as exhibited diagrammatically in FIG. 10.

It is desired to mention here that any preferred number of the spindles or rolls 87 may be employed in the row on the harvesting head, as found desirable, and it is not intended to restrict the invention to any precise number of spindles. The direction of rotation of the rolls 87 is readily reversible by the operator, in the event that tree branches become tangled with the rolls.

Figure 9:
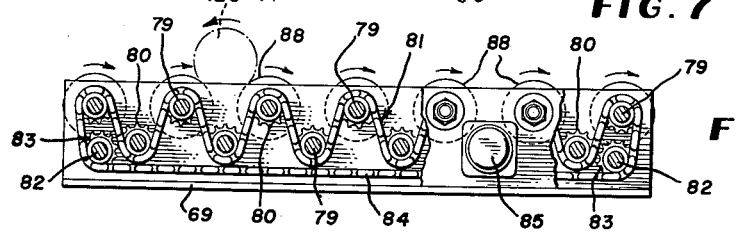
FIG. 9 is a bottom plan view of the elements shown in FIG. 7.

With final reference to FIGS. 3, 7 and 9, it may be seen that the orange, or like fruit, 129, is engaged by the rear sides of the revolving rolls 87 as the latter comb the oranges upwardly and outwardly upon the tree. Each orange will engage between a pair of adjacent rolls 87 which have their grooves 89 formed in opposite directions, that is, right and left hand. One grooved roll will thus exert a pulling motion on one side of the orange, while the adjacent roll with the opposite hand groove will exert a pushing motion on the other side of the orange. The two rolls thus aid each other in rotating or spinning the orange 129 upon its stem to sever or twist the stem from the branch. The stem will be under some tension when twisted due to the combing action provided by the movement of the row of rolls 87 over the tree.

When the oranges are thus being harvested from the lower branches of the tree, FIG. 1, the rolls 87 are adjusted generally vertically by the cylinder 58. When the oranges are being harvested from the top of the tree, the rolls 87 may be adjusted more nearly horizontally by the cylinder 58. The cylinder 37' is utilized to swing the upper boom section 23 from the bottom to the top of the tree.

The motor 21 and the cylinder 54 are utilized in conjunction to enable the rolls 87 to comb the fruit from the side portions of the tree, or approximately from one-half the circumference of the tree, as explained.

By manipulating the controls properly, substantially all of the usable fruit may be expeditiously removed from the tree by the action of the rolls 87 and when the storage hopper 93 is filled, the upper boom section may be swung to the lowermost position, shown in FIG. 1, and the fruit deposited in the tote box 100 by merely releasing the gate 95 by pulling the flexible element 98.

It is to be understood that the form of the invention herewith shown and described is to be taken as a preferred example of the same and that various changes in the shape, size, and arrangement of parts may be resorted to without departing from the spirit of the invention or the scope of the sub-joined claims.

We claim:

1. Apparatus for harvesting oranges and the like, comprising a relatively stationary support, a lower boom section mounted upon said support for horizontal rotation and vertical swinging movement, power operated means connected to rotate said lower boom section and lower boom power operated means connected to swing the same vertically, an upper boom section pivotally connected with the lower boom section and being vertically swingable, upper boom power operated means connected to swing the upper boom section vertically relative to the lower boom section, harvesting head means carried by the upper boom section and being vertically swingable and horizontally rotatable relative to the upper boom section, head power operated means connected with said head means to swing the same vertically and to rotate the same horizontally relative to the upper boom section, said harvesting head means including a plurality of spaced upstanding rolls journaled thereon and projecting thereabove and being engageable with the tree fruit, power operated means connected with said rolls to rotate the same in one direction in unison, whereby said rolls may engage the tree fruit with a combing action and to impart rotation to the fruit upon its stems to sever the same therefrom, and conveyor chute means associated with said hear means and upper boom section and having an open end near one side of said rolls and adapted to receive the fruit as it is removed from the tree by said rolls.

2. Apparatus for harvesting oranges and the like according to claim 1, and wherein said plurality of rolls are equidistantly spaced apart in a substantially straight row to form a comb-like structure.

3. Apparatus for harvesting oranges and the like according to claim 2, and wherein said plurality of rolls have a covering of resilient material and said covering of each roll is spirally grooved.

4. Apparatus for harvesting orange sand the like according to claim 3 and wherein alternate rolls in the row of rolls are spirally grooved in opposite directions.

5. A harvester for tree fruit comprising a support, a turntable mounted upon the support, an upstanding articulated boom carried by the turntable including boom sections which are angularly adjustable with respect to each other and to the turntable, a substantially vertical member carried by the boom near its top, a harvester head journaled upon said member for horizontal swinging movement relative to the boom, power operated means connected to swing said harvester head horizontally upon said member, pivot means interconnecting said head and member whereby the head may also swing vertically relative to said member, second power operated means connected with said member and head to swing the head vertically relative to said member, a flexible conveyor chute connected with said head to move therewith when the head swings horizontally or vertically, said harvester head including a plurality of spaced rolls carried thereon near the mouth of said conveyor chute and constituting a comb-like structure engageable with fruit upon a tree, and power operated means carried by said head and connected with said rolls to rotate the same in one direction in unison.

6. Apparatus for harvesting oranges and the like comprising a mobile support, an articulated boom journaled upon the support for rotation in a horizontal plane and including lower and upper independently operable boom sections adapted for vertical swinging movement, harvesting head means pivoted to the upper boom section for vertical and horizontal swinging movement relative thereto, storage conveyor means associated with said head means to receive the harvested oranges, said harvesting head means including a row of spaced upstanding rotary harvesting rolls for engaging the oranges on an orange tree with a combing action and adapted to impart rotation to the oranges on their stems for removing the oranges from the orange tree.

7. Apparatus for harvesting oranges or the like, comprising a mobile support, an articulated boom rotatably mounted upon said support and including a plurality of pivotally connected boom sections adapted to swing vertically, there being an uppermost boom section, a vertically extending member carried by the uppermost boom section, a harvesting head including a plurality of spaced upstanding rotary harvesting rolls journaled upon said vertically extending member for horizontal swinging movement relative thereto, power operated reciprocatory gearing means carried by said uppermost boom section and connected with said harvesting head to swing the same horizontal upon said vertically extending member, said harvesting head having pivot means to permit the head to swing vertically with respect to the vertically extending member, and separate power operated means connected with said harvesting head to swing the same vertically with respect to said member.

8. A harvester for oranges and the like, comprising a mobile support, an articulated boom mounted upon said support and including an uppermost vertically swingable boom section, a vertical member carried by said uppermost boom section, bearings journaled for rotation upon said vertical member, a harvesting head including spaced upstanding rotary harvesting rolls pivotally secured to one of said bearings for vertical swinging movement relative thereto, fluid-pressure operated means pivoted to said head and the other bearing and adapted to swing the head vertically and being turnable with said bearings upon the axis of said vertical member, a pinion secured to said other bearing for imparting rotation to the same, a rack bar meshing with said pinion to drive the same, and fluid-pressure operated reciprocatory means carried by said uppermost boom section and carrying the rack bar and reciprocating the latter to drive said pinion.

9. A harvester for oranges and the like according to claim 8, and storage conveyor means associated with said head and uppermost boom section to receive the oranges stripped from the tree by said rotary rolls of the head.

10. A harvester for globular tree fruit comprising a support, a rotary articulated boom mounted upon said support and including an upper vertically swingable boom section, harvesting head means pivotally mounted upon said uppermost boom section for horizontal and vertical swinging movement, power operated means to swing said head horizontally and vertically relative to said uppermost boom section, said harvesting head means including a plurality of spaced upstanding rolls connected for rotation and arranged in a row and constituting a comb to engage the fruit near the outer reaches of the tree branches, and power operated means to rotate all of said rolls in the same direction in unison.

11. A harvester for globular tree fruit according to claim 10, and wherein said rolls have a resilient covering and said covering is spirally grooved longitudinally of the rolls, and the coverings of alternate rolls in said row are spirally grooved in opposite directions.

12. A harvester for tree fruit comprising a support, a horizontal turntable journaled upon the support, power operated means to rotate the turntable, an articulated boom pivotally mounted upon said turntable and including lower and upper boom sections adapted to swing vertically relative to the turntable and to each other, separate power operated means connected with said lower and upper boom sections to swing the same vertically independently, harvesting head means pivotally mounted upon said upper boom section for horizontal and vertical swinging movement, separate power operated means connected with said head means to swing the same horizontally and vertically upon said upper boom section, said harvesting head including a plurality of spaced fruit engaging rotary means adapted to impart rotation to the fruit on their stems to remove the fruit from the tree, power operated means connected to rotate said rotary means, and flexible storage conveyor means connected with said head means and upper boom section and having an inlet opening near corresponding sides of said rotary means for receiving the fruit stripped from the tree by said rotary means.

13. A harvester for tree fruit according to claim 12, and a discharge gate in said storage conveyor means to facilitate dumping the fruit from the same when said upper boom section is swung to a lowered position near the ground.

References Cited in the file of this patent
UNITED STATES PATENTS

| | | |
|---|---|---|
| 1,077,640 | Randall | Nov. 4, 1913 |
| 2,131,672 | Rich | Sept. 27, 1938 |
| 2,450,152 | Miller | Sept. 28, 1948 |
| 2,674,500 | Hukari | Apr. 6, 1954 |
| 2,685,773 | Dauenhauer | Aug. 10, 1954 |
| 2,815,250 | Thornton-Trump | Dec. 3, 1957 |
| 2,829,814 | Warner | Apr. 8, 1958 |
| 2,867,964 | Roberts | Jan. 13, 1959 |
| 2,929,184 | Lamouria | Mar. 22, 1960 |